United States Patent
Hanai et al.

(10) Patent No.: US 12,500,750 B2
(45) Date of Patent: Dec. 16, 2025

(54) QUANTUM KEY DELIVERY SERVICE PLATFORM

(71) Applicants: KABUSHIKI KAISHA TOSHIBA, Tokyo (JP); TOSHIBA DIGITAL SOLUTIONS CORPORATION, Kawasaki (JP)

(72) Inventors: Katsuyuki Hanai, Tokyo (JP); Masanori Tomoda, Tokyo (JP)

(73) Assignees: Kabushiki Kaisha Toshiba, Kawasaki (JP); Toshiba Digital Solutions Corporation, Kawasaki (JP)

( * ) Notice: Subject to any disclaimer, the term of this patent is extended or adjusted under 35 U.S.C. 154(b) by 194 days.

(21) Appl. No.: 18/361,801

(22) Filed: Jul. 28, 2023

(65) Prior Publication Data
US 2024/0048370 A1    Feb. 8, 2024

Related U.S. Application Data

(63) Continuation of application No. PCT/JP2021/043394, filed on Nov. 26, 2021.

(30) Foreign Application Priority Data

Jan. 29, 2021  (JP) ................ 2021-012971

(51) Int. Cl.
H04L 9/08     (2006.01)
H04L 9/14     (2006.01)

(52) U.S. Cl.
CPC .............. H04L 9/0852 (2013.01); H04L 9/14 (2013.01)

(58) Field of Classification Search
CPC ... H04L 9/0852; H04L 9/0855; H04L 9/0861; H04L 9/0891; H04L 9/0894; H04L 9/14; H04L 9/16
See application file for complete search history.

(56) References Cited

U.S. PATENT DOCUMENTS 7,734,757 B2 *  6/2010  Maeda ................ H04L 9/0858
                                                      709/229
8,204,231 B2 *  6/2012  Maeda ................ H04L 9/0891
                                                      380/279

(Continued)

FOREIGN PATENT DOCUMENTS

CN    108134669 B    12/2020
JP    2008-306633 A  12/2008

(Continued)

OTHER PUBLICATIONS

Machine translation of Shibata Yoichi et al., WO2016/147349 (machine translation obtained Apr. 4, 2025) (Year: 2025).*

(Continued)

*Primary Examiner* — Sharon S Lynch
(74) *Attorney, Agent, or Firm* — Finnegan, Henderson, Farabow, Garrett & Dunner, LLP

(57) ABSTRACT

According to one embodiment, a quantum key delivery service platform includes a plurality of quantum key delivery devices and a management server. The server monitors a storage amount of the encryption keys in the plurality of quantum key delivery devices, records a consumption record of the encryption keys for each of the plurality of cryptographic communication devices, predicts a consumption amount of the encryption keys based on the consumption record of the encryption keys, and detects a sign of shortage of the encryption keys based on the storage amount of the encryption keys and a prediction result of the consumption amount of the cryptographic keys.

8 Claims, 7 Drawing Sheets

(56) References Cited

U.S. PATENT DOCUMENTS

| | | | |
|---|---|---|---|
| 8,638,942 B2* | 1/2014 | Maeda | H04L 9/083 380/278 |
| 9,356,780 B2* | 5/2016 | Tanizawa | H04L 63/06 |
| 9,654,287 B2* | 5/2017 | Zhao | H04L 9/083 |
| 10,348,493 B2* | 7/2019 | Fu | H04L 45/00 |
| 10,439,807 B2* | 10/2019 | Tanizawa | H04L 63/068 |
| 10,630,464 B2* | 4/2020 | Tanizawa | H04L 9/0852 |
| 12,137,160 B2* | 11/2024 | Williams | H04B 10/70 |
| 2006/0062392 A1* | 3/2006 | Lee | H04L 9/0852 380/278 |
| 2008/0147820 A1* | 6/2008 | Maeda | H04L 63/06 709/213 |
| 2009/0262942 A1* | 10/2009 | Maeda | H04L 9/083 380/278 |
| 2009/0316910 A1* | 12/2009 | Maeda | H04L 9/0891 380/279 |
| 2011/0243331 A1* | 10/2011 | Yasuda | H04L 9/0836 380/46 |
| 2014/0331050 A1* | 11/2014 | Armstrong | H04L 9/0855 380/278 |
| 2014/0365774 A1* | 12/2014 | Tanizawa | H04L 9/0852 713/171 |
| 2016/0127127 A1* | 5/2016 | Zhao | H04W 12/041 713/171 |
| 2016/0248581 A1* | 8/2016 | Fu | H04L 45/00 |
| 2018/0054306 A1* | 2/2018 | Tanizawa | H04L 9/0819 |
| 2018/0062836 A1* | 3/2018 | Tanizawa | H04L 9/0852 |
| 2019/0260581 A1* | 8/2019 | Su | H04L 9/08 |
| 2022/0393866 A1* | 12/2022 | Williams | H04B 7/18508 |

FOREIGN PATENT DOCUMENTS

| | | |
|---|---|---|
| JP | 2011-44768 A | 3/2011 |
| JP | 2014-241464 A | 12/2014 |
| JP | 2018-502514 A | 1/2018 |
| JP | 6615718 B2 | 12/2019 |
| WO | WO 2016/112086 A1 | 7/2016 |
| WO | WO 2016/147340 A1 | 9/2016 |

OTHER PUBLICATIONS

Int'l Telecomm. Union, LS on Work progress on Quantum Key Distribution (QKD) network in SG13, QKD(19)026005, ISG QKD Quantum Key Distribution, "Draft Recommendation ITU-T Y.QKDN_KM, Key management for Quantum Key Distribution Network," 17 pages, XP014342560, URL: docbox.etsi.org/ISG/QKD/05-CONTRIBUTIONS/2019/QKD(19)026005_LS_on_Work_progress_on_Quantum_Key_Distribution_QKD_networ/SG13-LS97_att3.pdf (2019).

European Patent Office, Extended European Search Report in EP App. No. 21923113.1, 11 pages (Nov. 25, 2024).

* cited by examiner

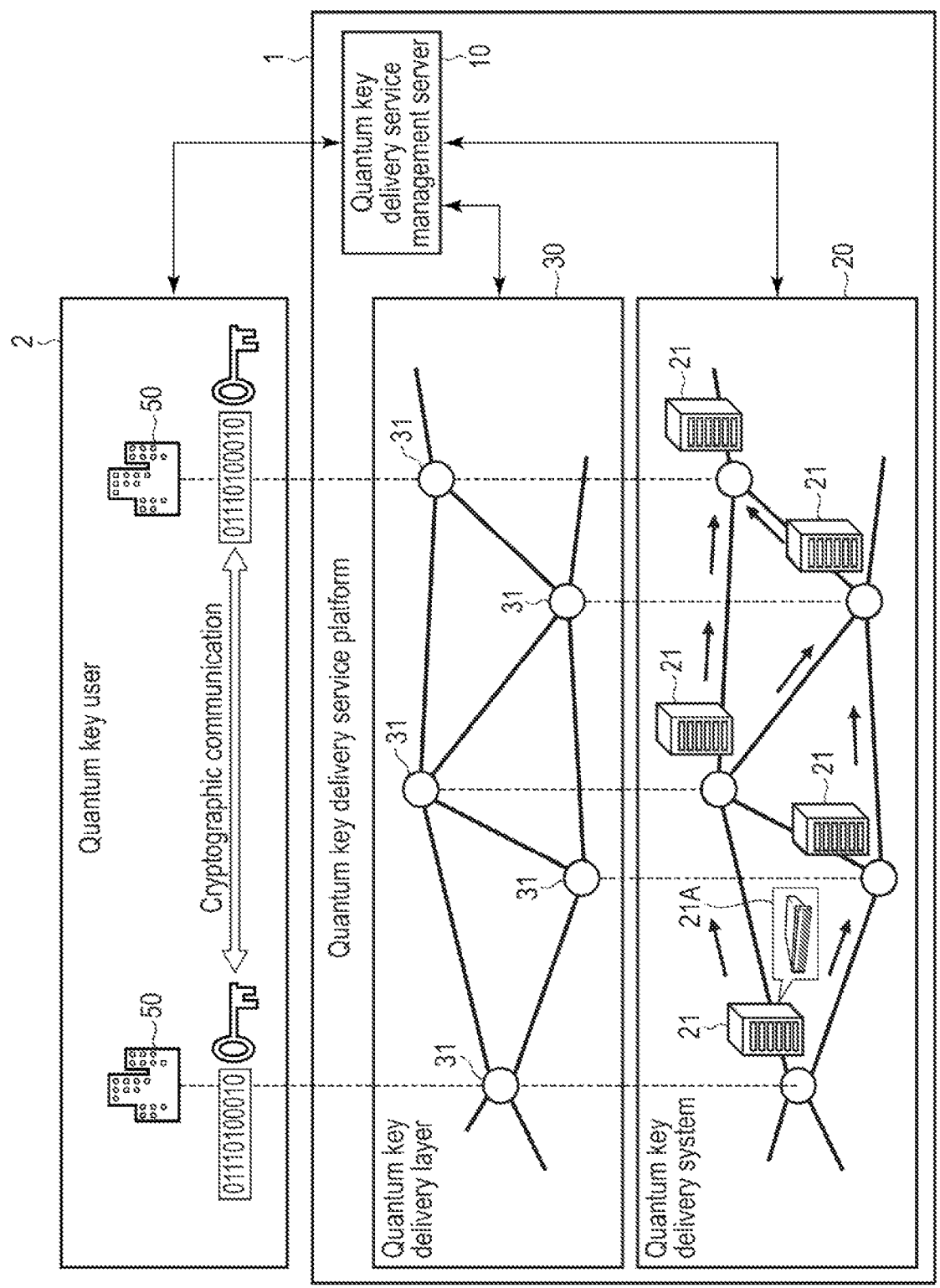
F I G. 1

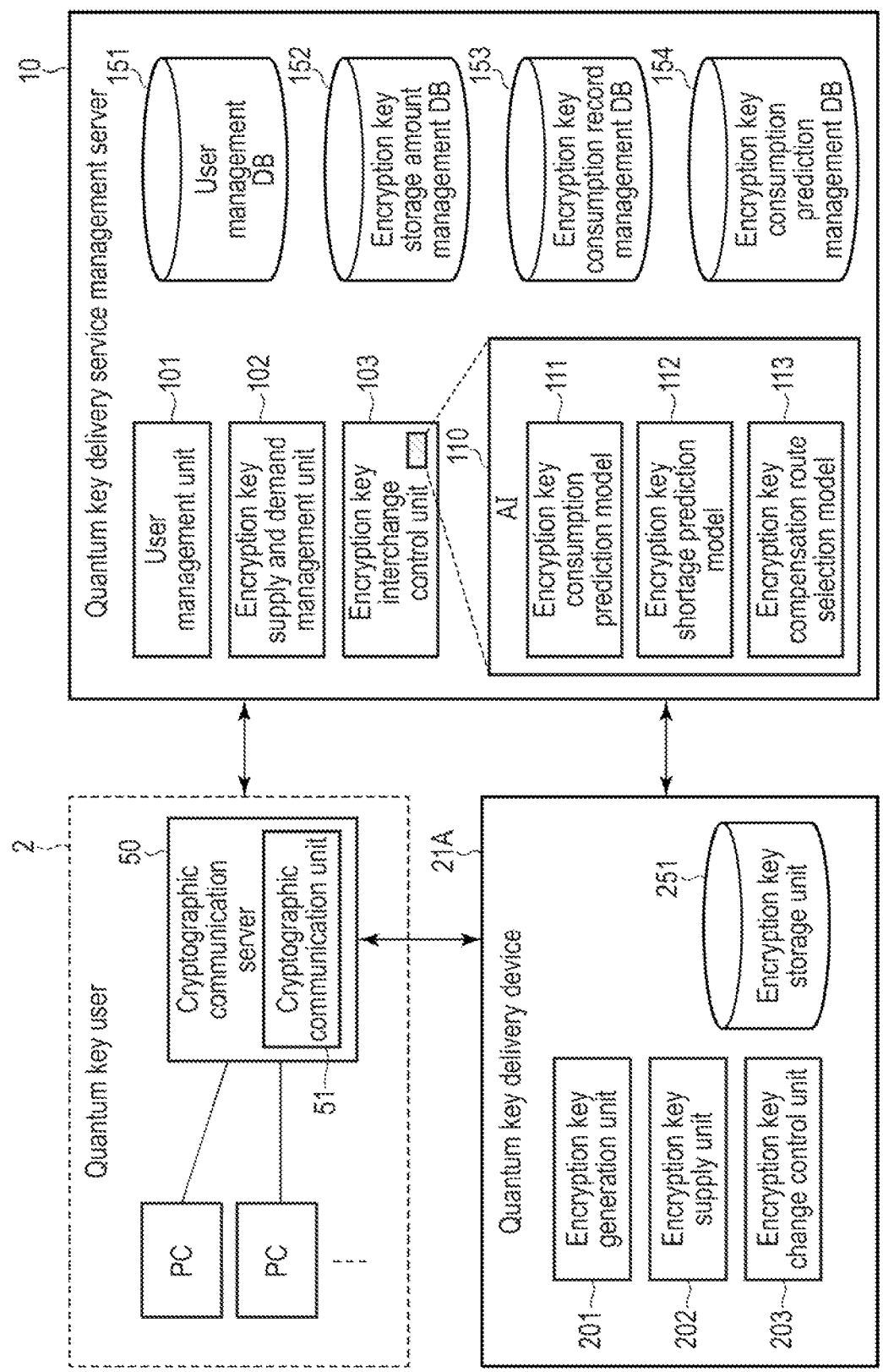
F I G. 2

QUANTUM KEY DELIVERY SERVICE PLATFORM

CROSS-REFERENCE TO RELATED APPLICATIONS

This application is a Continuation Application of PCT Application No. PCT/JP2021/043394, filed Nov. 26, 2021 and based upon and claiming the benefit of priority from Japanese Patent Application No. 2021-012971, filed Jan. 29, 2021, the entire contents of all of which are incorporated herein by reference.

FIELD

Embodiments described herein relate generally to a quantum key delivery service platform.

BACKGROUND

In recent years, encrypting data, and sending and receiving the data between bases connected via a network have been executed on a day-to-day basis. In addition, one-time pad cryptography (OTP), which cannot be deciphered with ciphertext alone, has been widely used. OTP consumes as much encryption keys as data. Then, in performing cryptographic communication using OTP, it is required to safely share the encryption keys, which are consumed in large amounts, between bases. For this reason, quantum key delivery, which shares an encryption key (quantum key) based on the principles of quantum mechanics, is focused.

The quantum key delivery is a technology that uses the behavior of photons, and generates and shares encryption keys by sending and receiving encryption key information using photons between bases using optical fibers (or vacuum) as a medium. It takes a certain amount of time to generate and share the encryption keys. In recent years, when data communication speeds have dramatically improved, the amount of encryption keys consumed by cryptographic communication per unit time may exceed the amount of encryption keys that can be generated and shared per unit time. Therefore, in order to stably continue the cryptographic communication for a certain period of time, it is required to store a certain amount of encryption keys.

For example, when providing a service that provides encryption keys generated and shared by quantum key delivery to each base for users who perform the cryptographic communication between bases, an upper limit may have to be set on the encryption key generation/sharing performance and the amount of storage of the encryption keys, i.e., the ability to supply the encryption keys, in consideration of a balance with costs. It is therefore necessary to adaptively manage the encryption keys in accordance with the consumption status of the encryption keys of each user such that any user does not run out of (deplete) encryption keys.

BRIEF DESCRIPTION OF THE DRAWINGS

FIG. 1 is a diagram showing an example of a configuration of a quantum key delivery service platform of the embodiments.

FIG. 2 is a diagram showing an example of functional blocks of a quantum key delivery service management server of the quantum key delivery service platform of the embodiments.

DETAILED DESCRIPTION

Figure 3:
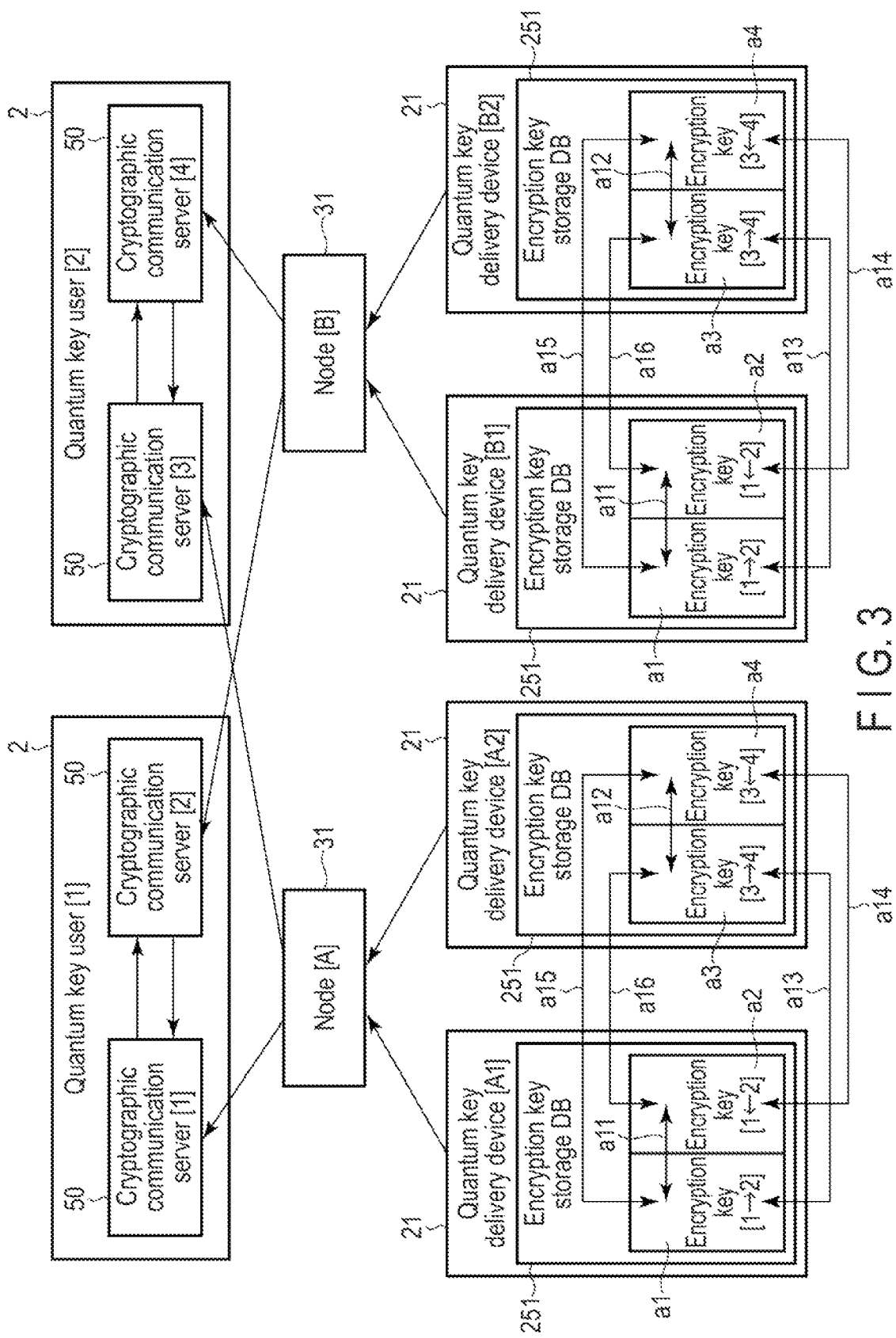
FIG. 3 is a diagram for illustrating encryption key change control that can be performed in the quantum key delivery service platform of the embodiments.

Embodiments will be described hereinafter with reference to the accompanying drawings.

In general, according to one embodiment, a quantum key delivery service platform includes a plurality of quantum key delivery devices and a management server. The plurality of quantum key delivery devices transmits and receives encryption key information to and from the other quantum key delivery device, and generates encryption keys shared with the other quantum key delivery device, based on the encryption key information. The management server manages supply of the encryption keys by the plurality of quantum key delivery devices to a plurality of cryptographic communication devices which perform cryptographic communication using the encryption keys. The server monitors a storage amount of the encryption keys stored for each of the plurality of cryptographic communication devices, in the plurality of quantum key delivery devices, records a consumption record of the encryption keys for each of the plurality of cryptographic communication devices, predicts a consumption amount of the encryption keys in each of the plurality of cryptographic communication devices, based on the consumption record of the encryption keys, and detects a sign of shortage of the encryption keys which is likely to occur in cryptographic communication between the plurality of cryptographic communication devices, based on the storage amount of the encryption keys and a prediction result of the consumption amount of the cryptographic keys.

FIG. 1 is a diagram showing an example of a configuration of a quantum key delivery service platform 1 of the embodiments. FIG. 1 also shows an aspect example of cryptographic communication executed by a quantum key user 2 who receives an encryption key (quantum key) provided from the quantum key delivery service platform 1.

The quantum key delivery service platform 1 provides a quantum key delivery service for users who perform cryptographic communication with OTP. More specifically, the quantum key delivery service platform 1 supplies a shared encryption key to each base of users who perform the cryptographic communication between bases. By using this quantum key delivery service, the users do not need resources necessary to generate and share the encryption keys between the bases.

The quantum key delivery service platform 1 includes a quantum key delivery system 20. The quantum key delivery system 20 is configured as an optical fiber network in which quantum key delivery devices 21A of a plurality of quantum key delivery centers 21 located in various places are connected via optical fibers. One or more quantum key delivery devices 21A are arranged in each of the plurality of quantum key delivery centers 21.

The quantum key delivery device 21A transmits and receives encryption key information to and from another quantum key delivery device 21A, by photons, and both devices generate a shared encryption key based on the encryption key information. The quantum key delivery device 21A also functions as a relay device that relays the encryption key information. In other words, the encryption keys can be shared not only between the quantum key delivery devices 21A directly connected by optical fibers, but also between the quantum key delivery devices 21A in which one or more quantum key delivery devices 21A are intervened. When it is assumed that the quantum key delivery centers 21 exist at N locations, a set of two quantum key delivery centers 21 that can generate shared encryption keys can be set in $(N \times (N-1))/(2 \times 1)$ manners.

In addition, the quantum key delivery service platform 1 includes a quantum key delivery layer 30. The quantum key delivery layer 30 is configured as a virtual communication network on the assumption that the quantum key delivery center 21 of the quantum key delivery system 20 is simulated as a node 31 and the nodes 31 are connected by a communication channel. The quantum key delivery layer 30 can include a plurality of communication networks. The plurality of communication networks in the quantum key delivery layer 30 may be created separately for each area or may be created to deliver the quantum key users 2 to several groups.

The node 31 of the quantum key delivery layer 30 is positioned as an access point of the quantum key delivery service platform 1. Each cryptographic communication server 50 of the quantum key user 2 that performs cryptographic communication by OTP is supplied with an encryption key from, for example, the node 31 corresponding to the nearest quantum key delivery center 21. At this time, it is assumed that the cryptographic communication server 50 and the node 31 are arranged on the same site or in the same building and that physical protection is provided for communication between them.

As described above, when it is assumed that the quantum key delivery centers 21 exist at N locations, a set of two quantum key delivery centers 21 sharing the encryption key can be set in $(N \times (N-1))/(2 \times 1)$ manners. Therefore, the quantum key delivery service platform 1 can provide a service of supplying encryption keys for $(N \times (N-1))/(2 \times 1)$ sections. In addition, as described above, one or more quantum key delivery devices 21A are arranged in the quantum key delivery center 21. The encryption keys generated by the one or more quantum key delivery devices 21A are assigned to each cryptographic communication performed in each section set with the quantum key delivery center 21 serving as one end. In addition, some of the encryption keys generated by the one or more quantum key delivery devices 21A are assigned as backup for their cryptographic communication.

In other words, when the cryptographic communication server 50 performs cryptographic communication with a plurality of cryptographic communication servers 50, the encryption key is supplied to the cryptographic communication server 50 for each communication partner. For example, in a case where the cryptographic communication server [1] 50 at a base in Tokyo performs cryptographic communication with a cryptographic communication server [2] 50 at a base in Osaka and also performs cryptographic communication with a cryptographic communication server [3] 50 in Fukuoka, the quantum key delivery service platform 1 supplies to a set of the cryptographic communication server [1] 50 and the cryptographic communication server [2] 50 the encryption keys generated and shared between the quantum key delivery centers 21 corresponding to the nodes 31 to which the servers are connected respectively, and supplies to a set of the cryptographic communication server [1] 50 and the cryptographic communication server [3] 50 the encryption keys generated and shared between the quantum key delivery centers 21 corresponding to the nodes 31 to which the servers are connected respectively. In other words, in this case, the cryptographic communication server [1] 50 is supplied with the encryption key for cryptographic communication with the cryptographic communication server [2] 50, from the node 31, and supplied with the encryption key for cryptographic communication with the cryptographic communication server [3] 50, from the same node 31.

In addition, the quantum key delivery service platform 1 supplies to the cryptographic communication server 50 the encryption key for encrypting the data to be transmitted to the communication partner and the encryption key for decrypting the encrypted data received from the communication partner. Therefore, in the above case, the quantum key delivery service platform 1 supplies, for example, six types of encryption keys for each communication partner and communication direction from the node 31 to the cryptographic communication server [1] 50.

The quantum key delivery layer 30 may be configured not as a virtual communication network but as a real communication network. The quantum key delivery service platform 1 may lend the communication network of the quantum key delivery layer 30 as a cryptographic communication channel to the quantum key user 2 who is supplied with the encryption key from the node 31 to perform the cryptographic communication. This communication network does not need to be an optical fiber network (but may be an optical fiber network).

The quantum key delivery service platform 1 includes a quantum key delivery service management server 10 for adaptively managing the supply of the encryption keys from the quantum key delivery centers 21 (quantum key delivery devices 21A) of the quantum key delivery system 20, to the cryptographic communication servers 50 of the quantum key user 2, via the nodes 31 of the quantum key delivery layer 30, as described above. The quantum key delivery service platform 1 of the present embodiment enables the quantum key delivery service management server 10 to detect a sign of shortage (depletion) of the encryption keys such that, for example, the encryption keys can be exchanged between users before the encryption keys run out, and this point will be described below in detail.

FIG. 2 is a diagram showing an example of functional blocks of the quantum key delivery service management server 10. FIG. 2 shows an example of functional blocks of the quantum key delivery device 21A and the cryptographic communication server 50 together.

The cryptographic communication server 50 includes a cryptographic communication unit 51. The cryptographic communication unit 51 performs cryptographic communication with the cryptographic communication unit 51 of the cryptographic communication server 50 at the other base. The cryptographic communication server 50 is connected to, for example, a plurality of personal computers (PC) in the base via a local area network (LAN). The cryptographic communication unit 51 is supplied with the encryption key from the quantum key delivery device 21A (recognized as the node 31 by the cryptographic communication unit 51), and the PC connected to the cryptographic communication server 50 performs encryption and decryption of the data sent to and received from a PC connected to the cryptographic communication server 50 in the other base.

The quantum key delivery device 21A includes an encryption key generation unit 201, an encryption key supply unit 202, and an encryption key change control unit 203. In addition, the quantum key delivery device 21A includes an encryption key storage unit 251 provided on, for example, a storage medium such as a hard disk drive (HDD). An aggregate of one or more quantum key delivery devices 21A arranged in the quantum key delivery center 21 is shown as one quantum key delivery device 21A in FIG. 2. Therefore, the quantum key delivery device 21A in FIG. 2 can be read as the quantum key delivery center 21. In addition, for example, some of the units shown as constituent elements of the quantum key delivery device 21A in FIG. 2 may not exist in each quantum key delivery device 21 but exist in the quantum key delivery center 21.

The encryption key generation unit 201 transmits and receives encryption key information to and from the encryption key generation unit 201 of the other quantum key delivery device 21A by photons, and generates the encryption key shared between the quantum key delivery device 21A which incorporates the encryption key generation unit 201 and the other quantum key delivery device 21A, based on the encryption key information. The transmission and reception of the encryption key information may be performed unilaterally from one side to the other side or may be performed bidirectionally. When the transmission and reception are performed bidirectionally, for example, the encryption key information transferred from one side to the other side may be information for generating an encryption key used to encrypt data transferred from one side to the other side, and the encryption key information transferred from the other side to the one side may be information for generating an encryption key used to encrypt data transferred from the other side to the one side.

The encryption key generation unit 201 stores the generated encryption key in the encryption key storage unit 251. As described above, the encryption keys need to be prepared for each communication partner and each communication direction. Therefore, the encryption key generation unit 201 stores the generated encryption keys in the encryption key storage unit 251 for each communication partner and communication direction. The rate of assigning the generated encryption keys to each communication partner and each communication direction and storing the encryption keys in the encryption key storage unit 251 depends on results of encryption key consumption prediction of the encryption key exchange control unit 103 of the quantum key delivery service management server 10, which will be described later. The encryption key generation unit 201 may evenly assign a certain amount of the encryption key generation amount per unit time to each communication partner and each communication direction, and may assign the remaining amount to each communication partner and each communication direction, based on the results of the encryption key consumption prediction of the encryption key interchange control unit 103. In addition, the encryption key generation unit 201 reserves a certain amount of encryption keys in the encryption key storage unit 251 as a backup.

The encryption key generation unit 201 continuously generates the encryption keys. When the cryptographic communication is not performed or the amount of encryption keys stored in the cryptographic key storage unit 251 reaches an upper limit, the encryption key generation unit 201 discards the encryption keys in order of older keys and replaces the keys with newly generated encryption keys.

The encryption key supply unit 202 reads the encryption keys stored in the encryption key storage unit 251 and transmits encryption keys to the cryptographic communication unit 51 in response to a request from the cryptographic communication unit 51. It is assumed here that the quantum key delivery device 21A is associated with the cryptographic communication server 50 for each cryptographic communication performed by the cryptographic communication unit 51. In other words, a plurality of quantum key delivery devices 21A can be associated with the cryptographic communication server 50. In addition, it is assumed here that the amount of encryption keys consumed per unit time by the cryptographic communication unit 51 exceeds the amount of encryption keys that the encryption key generation unit 201 can generate per unit time. Therefore, while the cryptographic communication unit 51 continues the cryptographic communication, the storage amount of the encryption keys in the cryptographic key storage unit 251 for the cryptographic communication decreases. The encryption key supply unit 202 notifies the quantum key delivery service management server 10 of the consumption amount of the encryption keys, and the storage amount of the encryption keys in the encryption key storage unit 251, for example, for each predetermined timing or each time a certain amount of encryption keys is supplied.

The encryption key change control unit 203 performs encryption key change control of interchanging the encryption keys stored in the encryption key storage unit 251 with, for example, the other quantum key delivery devices 21A arranged in the same quantum key delivery center 21, under instructions of the quantum key delivery service management server 10.

The encryption key change control that the encryption key change control unit 203 can perform under the control of the quantum key delivery service management server 10 will be described with reference to FIG. 3.

For example, it is assumed that a quantum key user [1] 2 and a quantum key user [2] 2 exist as users using the section connecting a node [A] 31 and a node [B] 31 of the quantum key delivery layer 30. At the quantum key user [1] 2, a cryptographic communication server [1] 50 is supplied with an encryption key from the node [A] 31, and a cryptographic communication server [2] 50 is supplied with an encryption key from the node [B] 31, to perform cryptographic communication between the cryptographic communication server [1] 50 and the cryptographic communication server [2] 50.

In contrast, in the quantum key user [2] 2, a cryptographic communication server [3] 50 is supplied with an encryption key from the node [A] 31, and a cryptographic communication server [4] 50 is supplied with an encryption key from the node [B] 31, to perform cryptographic communication between the cryptographic communication server [3] 50 and the cryptographic communication server [4] 50.

In addition, in the quantum key delivery system 20, encryption keys are generated and shared between a quantum key delivery device [A1] 21 and a quantum key delivery device [B1], and encryption keys are generated and shared between a quantum delivery device [A2] 21 and a quantum key delivery device [B2]. To make understanding easier, it is assumed here that the encryption keys generated by the quantum key delivery device [A1] 21 are supplied to the cryptographic communication server [1] 50 via the node [A] 31 and that the encryption keys generated by the quantum key delivery device [B1] 21 are supplied to the cryptographic communication server [2] 50 via the node [B] 31. Furthermore, it is assumed here that the encryption keys generated by the quantum key delivery device [A2] 21 are supplied to the cryptographic communication server [3] 50 via the node [A] 31 and that the encryption keys generated by the quantum key delivery device [B2] 21 are supplied to the cryptographic communication server [4] 50 via the node [B] 31.

The quantum key delivery device [A1] 21 stores in the encryption key storage unit 251 an encryption key a1 for encrypting the data that the cryptographic communication server [1] 50 transmits to the cryptographic communication server [2] 50, and an encryption key a2 for decrypting the (encrypted) data that the cryptographic communication server [1] 50 receives from the cryptographic communication server [2] 50.

The quantum key delivery device [B1] 21 also stores the encryption key a1 and the encryption key a2 in the encryption key storage unit 251. In the quantum key delivery device [B1] 21, the encryption key a1 is used to decrypt the (encrypted) data that the cryptographic communication server [2] 50 receives from the cryptographic communication server [1] 50, and the encryption key a2 is used to encrypt the data that the cryptographic communication server [2] 50 transmits to the cryptographic communication server [1] 50.

The quantum key delivery device [A2] 21 stores in the encryption key storage unit 251 an encryption key a3 for encrypting the data that the cryptographic communication server [3] 50 transmits to the cryptographic communication server [4] 50, and an encryption key a4 for decrypting the (encrypted) data that the cryptographic communication server [3] 50 receives from the cryptographic communication server [4] 50.

The quantum key delivery device [B2] 21 also stores the encryption key a3 and the encryption key a4 in the encryption key storage unit 251. In the quantum key delivery device [B2] 21, the encryption key a3 is used to decrypt the (encrypted) data that the cryptographic communication server [4] 50 receives from the cryptographic communication server [3] 50, and the encryption key a4 is used to encrypt the data that the cryptographic communication server [4] 50 transmits to the cryptographic communication server [3] 50.

As described above, while certain cryptographic communication continues, the demand (consumption) of the encryption keys exceeds the supply (generation) of the encryption keys for the cryptographic communication. Therefore, the storage amount of encryption keys for the cryptographic communication decreases. In order to avoid shortage (depletion) of the encryption keys, the encryption key change control unit 203 controls encryption key change for the encryption keys a1 to a4, under the control of the quantum key delivery service management server 10, in the quantum key delivery service platform 1 of the present embodiment. For example, when the storage amount of the encryption key used for data transfer of certain cryptographic communication in a first direction is about to run out, and if there is room in the storage amount of the encryption key used for the data transfer in a second direction opposite to the first direction, change of the encryption keys can be performed between two directions of the cryptographic communication (a11 and a12). In addition, when the storage amount of the encryption key in one of the two cryptographic communications in the same section is about to run out, and if there is room in the storage amount of the other encryption key, exchange of the encryption keys can be performed between the two cryptographic communications (a13 to a16). The change of the encryption keys between two cryptographic communications can be performed for encryption keys used for the data transfer in the same direction (a13 and a14) and can be performed for the encryption keys used for the data transfer in directions different from each other (a15 and a16). The change of the encryption keys between two directions of certain cryptographic communication (a11 and a12) and the change of the encryption keys between two cryptographic communications (a13 to a16) can be performed in a complex manner.

The quantum key delivery service management server 10 will be described with reference to FIG. 2.

The quantum key delivery service management server 10 includes a user management unit 101, an encryption key supply and demand management unit 102, and an encryption key interchange control unit 103. In addition, the quantum key delivery service management server 10 includes a user management DB (data base) 151, an encryption key storage amount management DB 152, an encryption key consumption record management DB 153, and an encryption key consumption prediction management DB 154.

Figure 4:
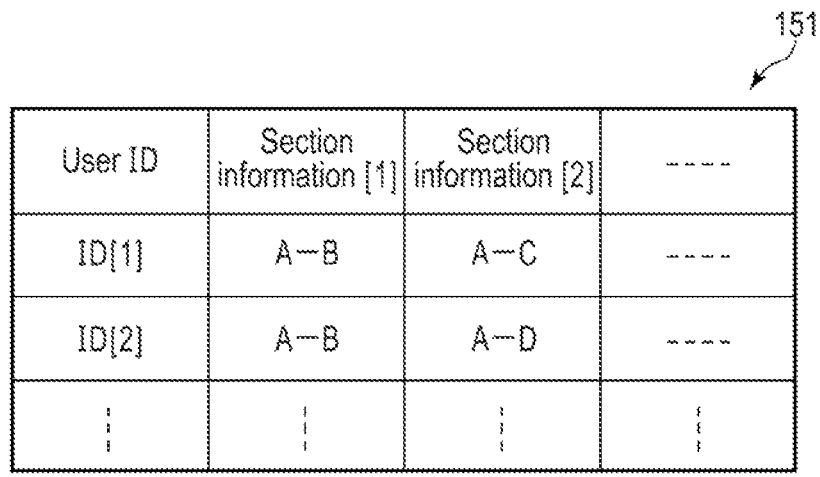
FIG. 4 is a diagram showing an example of user management DB used in the quantum key delivery service platform of the embodiments.

The user management unit 101 receives an application for use of the quantum key delivery service platform 1 via, for example, the Internet, and manages the information of the quantum key user 2 obtained at the time of application using the user management DB 151. The user management unit 101 also accepts an application for changing the form of use of the quantum key delivery service platform 1 and an application for suspension of use. FIG. 4 is a diagram showing an example of the user management DB 151.

The user management DB 151 stores user ID and one or more pieces of section information. A user ID is information for identifying the quantum key user 2. The section information is information indicating the section which the quantum key user 2 uses. The section information is represented by, for example, a set of two nodes 31. For example, for the quantum key user 2 who is supplied with the encryption keys for three sections, three pieces of section information are stored.

The encryption key supply and demand management unit 102 updates the encryption key storage amount management DB 152 and the encryption key consumption record management DB 153, based on the encryption key consumption amount and the encryption key storage amount of which the unit is notified by the quantum key delivery device 21A.

Figure 5:
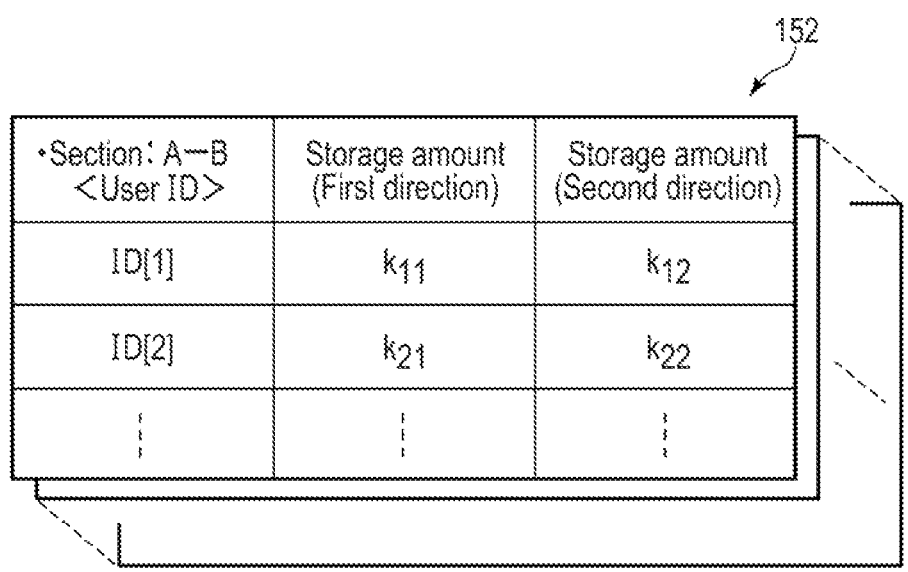
FIG. 5 is a diagram showing an example of encryption key storage amount management DB used in the quantum key delivery service platform of the embodiments.

FIG. 5 is a diagram showing an example of the encryption key storage amount management DB 152. The encryption key storage amount management DB 152 stores the user ID, the storage amount of encryption keys in the first direction, and the storage amount of encryption keys in the second direction (opposite to the first direction), for each section that is a set of two nodes of the quantum key delivery layer 30. In addition, the encryption key storage amount management DB 152 also stores the storage amount of backup encryption keys.

The user ID is information for identifying the quantum key user 2, similarly to the user management DB 151. The storage amount of the encryption keys in the first direction is the storage amount of the encryption keys in the first direction for cryptographic communication performed by the quantum key user 2 indicated by the user ID. The storage amount of the encryption keys in the second direction is the storage amount of the encryption keys in the second direction of the cryptographic communication. The storage amount of the encryption keys decreases while cryptographic communication is being performed, and increases or is kept at the upper limit while cryptographic communication is not performed.

Figure 6:
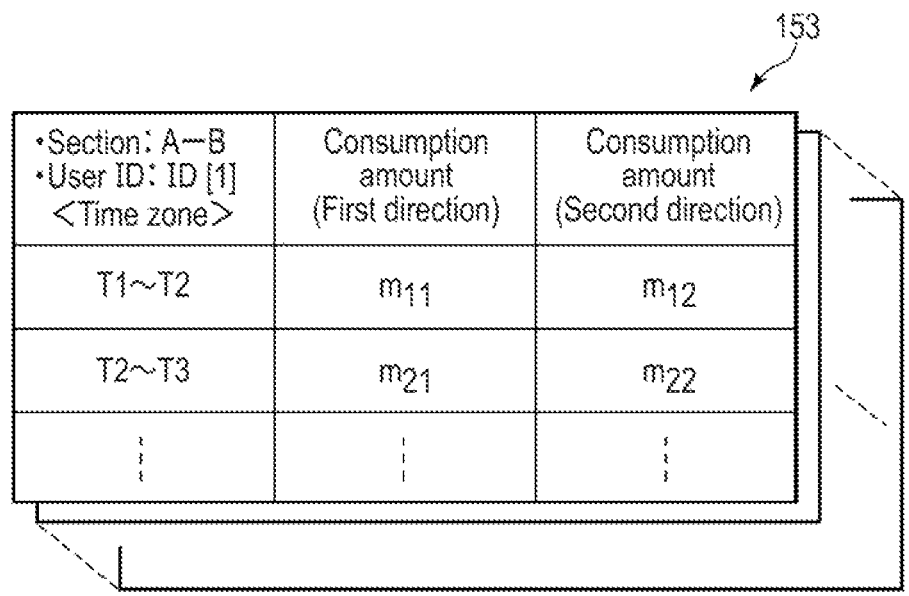
FIG. 6 is a diagram showing an example of encryption key consumption record management DB used in the quantum key delivery service platform of the embodiments.

FIG. 6 is a diagram showing an example of the encryption key consumption record management DB 153. The encryption key consumption record management DB 153 stores the consumption amount of the encryption keys in the first direction and the consumption amount of the encryption keys in the second direction for each section and for each user, for example, in units of time zones of a certain width such as 10 minutes or 1 hour. These pieces of information are accumulated for a preset period, for example, three years or the like, by the encryption key consumption record management DB 153.

Description of the quantum key delivery service management server 10 will be continued with reference to FIG. 2.

The encryption key interchange control unit 103 periodically performs predicting the consumption amount of the encryption keys for a certain following period, for all cryptographic communication that can be performed using the quantum key delivery service platform 1, by using the information of the encryption key consumption record management DB 153, and stores the results in the encryption key consumption prediction management DB 154. When the prediction target period at a previous prediction time overlaps with that at a current prediction time, the encryption key interchange control unit 103 updates the consumption amount of the encryption keys for the overlapping period to the current prediction result. The encryption key interchange control unit 103 executes this prediction using, for example, an artificial intelligence (AI) 110.

The AI 110 includes an encryption key consumption prediction model 111 for predicting a future encryption key consumption amount from past encryption key consumption trends. The encryption key consumption prediction model 111 is a model constructed to input, for example, changes in the consumption amount of the encryption keys for the most recent hour, the consumption amount of the encryption keys for the same time zone for the most recent week, the consumption amount of the encryption keys for the same day of the week and the same time zone for the most recent month, the consumption amount of the encryption keys for the same year, month and day and the same time zone for the most recent three years, and the like and to predict, for example, the consumption amount of the encryption keys for the next one day. A method of constructing various models of the AI 110 including the encryption key consumption prediction model 111 is not limited to a specific method, and various known methods can be adopted.

Figure 7:
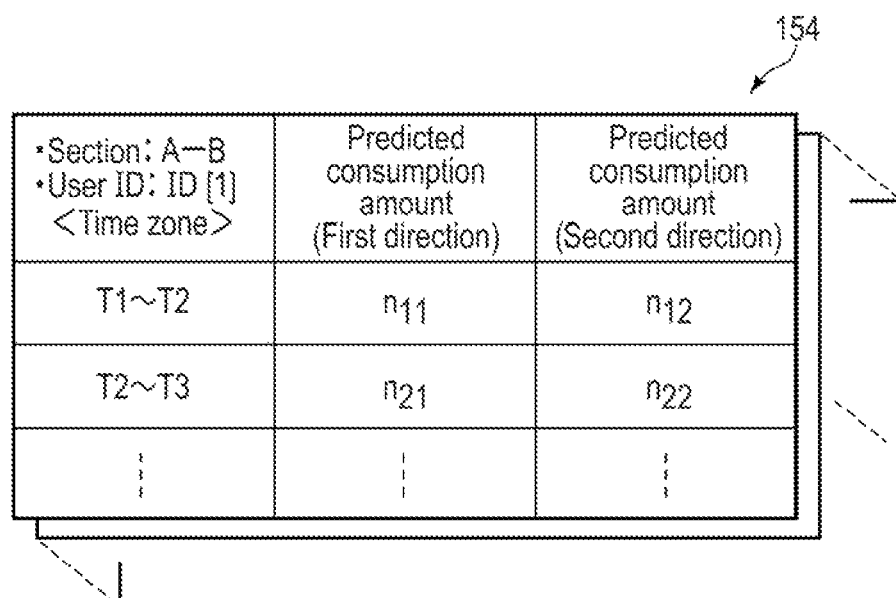
FIG. 7 is a diagram showing an example of encryption key consumption prediction management DB used in the quantum key delivery service platform of the embodiments.

FIG. 7 is a diagram showing an example of the encryption key consumption prediction management DB 154. The encryption key consumption prediction management DB 154 stores a predicted consumption amount of the encryption keys in the first direction and a predicted consumption amount of the encryption keys in the second direction, for each section and each user, in units of time zones of a certain width. The width of the time zone desirably matches the width of the time zone of the encryption key consumption record management DB 153 shown in FIG. 6.

In addition, the encryption key interchange control unit 103 detects a sign of shortage of the encryption keys, for the cryptographic communication which is being performed, using the quantum key delivery service platform 1, with the information in the encryption key storage amount management DB 152 and the information in the encryption key consumption prediction management DB 154. The information in the encryption key consumption record management DB 153 may be further used to detect a sign of shortage of the encryption keys. The encryption key interchange control unit 103 performs this detection by, for example, the AI 110.

The AI 110 includes an encryption key shortage prediction model 112 for detecting a sign of shortage of the encryption keys, based on the current storage amount of the encryption keys, and the consumption amount of the encryption keys, which is predicted by the encryption key consumption prediction model 111. The encryption key shortage prediction model 112 may further consider the previous consumption trends of the encryption keys for, for example, the most recent hour or the like. The encryption key shortage prediction model 112 is a model constructed to detect a sign of shortage of the encryption keys, which is caused by, for example, sudden consumption of the encryption keys greatly exceeding the consumption amount of the encryption keys predicted by the encryption key consumption prediction model 111. The encryption key shortage prediction model 112 detects a sign of shortage of the encryption keys for the cryptographic communication which is being performed, and outputs the amount of encryption keys required to avoid the shortage of the encryption keys for the cryptographic communication.

In addition, when a sign of shortage of the encryption keys is detected and when the encryption keys stored as a backup cannot compensate for the shortage, the encryption key interchange control unit 103 determines how to compensate for the amount of encryption keys necessary to avoid shortage of the encryption keys, output based on the detection of the sign of shortage of the encryption keys, using the information in the encryption key storage amount management DB 152 and the information in the encryption key consumption prediction management DB 154. FIG. 3 shows the compensation routes (a11 to a16) of the encryption keys between two quantum key users 2 but, in reality, when a large number of quantum key users perform cryptographic communication in the same section, a large number of candidates of compensation sources of the encryption keys exist. The encryption key interchange control unit 103 performs this determination by, for example, the AI 110.

The AI 110 includes an encryption key compensation route selection model 113 for selecting the cryptographic communication suitable for a compensation source of the encryption keys, expecting surplus of encryption keys to occur, based on the current storage amount of the encryption keys, and the predicted consumption amount of the future encryption keys. The encryption key compensation route selection model 113 may further consider the previous consumption trends of the encryption keys for, for example, the most recent hour or the like. The encryption key compensation route selection model 113 can select a plurality of cryptographic communications. The encryption key compensation route selection model 113 outputs the compensation amount of the encryption keys from each of the selected one or more cryptographic communications.

The encryption key interchange control unit 103 notifies each of the encryption key change control unit 203 of the quantum key delivery device 21A related to the cryptographic communication for which a sign of shortage of the encryption keys is detected, and the quantum key delivery device 21A related to the cryptographic communication selected as the compensation source of the encryption keys, of the interchange amount of the encryption keys. If the shortage of the encryption keys can be resolved by changing the encryption keys between the two directions of the cryptographic communication, only the quantum key delivery device 21A related to the cryptographic communication is notified.

The encryption key change control unit 203 of the quantum key delivery device 21A performs change of the encryption keys stored in the encryption key storage unit 251 with, for example, the encryption key change control unit 203 of the other quantum key delivery device 21A, under instructions from the quantum key delivery service management server 10.

As described above, in the quantum key delivery service platform 1 of the present embodiment, prediction of the consumption of encryption keys is performed, a sign of shortage of the encryption keys is detected, and the compensation route to avoid the shortage is selected by AI. As a result, the quantum key delivery service platform 1 of the present embodiment can adaptively manage the encryption keys.

As described above, a certain amount of the encryption keys generated by the encryption key generation unit 201 of the quantum key delivery device 21A may be equally assigned for each communication partner and each communication direction, and the remainder may be assigned for each communication partner and each communication direction, based the result of the encryption key consumption prediction of the encryption key interchange control unit 103 of the quantum key delivery service management server 10. Therefore, for example, when the encryption keys to be equally assigned are exchanged, the quantum key delivery service management server 10 may manage their amount and reflect the amount on the billing amount for the quantum key user 2. More specifically, a charge system may be established in which the billing amount is increased or decreased according to the exchange amount of equally assigned encryption keys.

Figure 8:
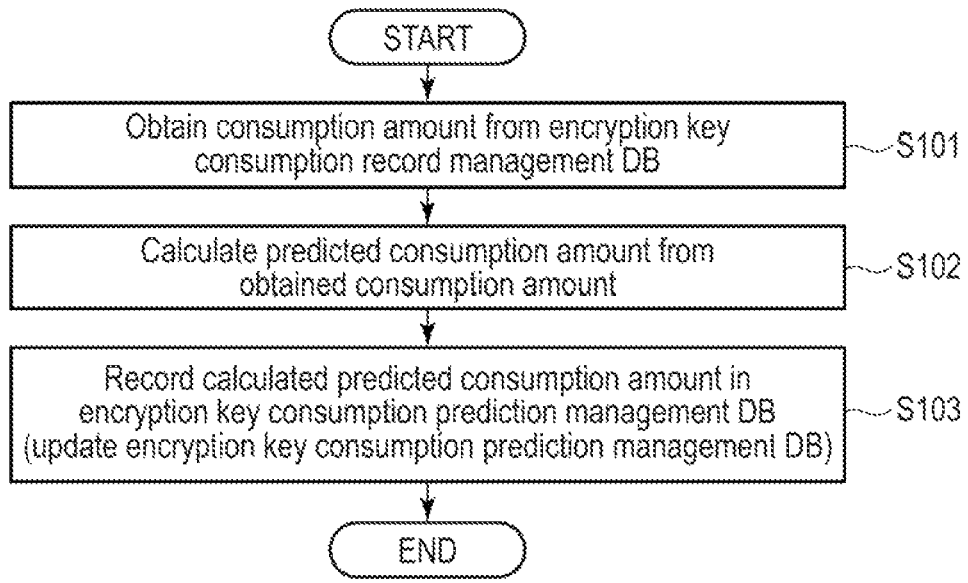
FIG. 8 is a flowchart showing an example of a flow of prediction of the consumption amount of encryption keys by the quantum key delivery service management server of the quantum key delivery service platform of the embodiments.

FIG. 8 is a flowchart showing an example of a flow of the prediction of the consumption amount of the encryption keys by the quantum key delivery service management server 10 of the quantum key delivery service platform 1 of the embodiments. The quantum key delivery service management server 10 periodically performs the prediction of the consumption amount of the encryption keys, for example, for each width of the time zone of the encryption key consumption record management DB 153 shown in FIG. 6 or each width of the time zone of the encryption key consumption prediction management DB 154 shown in FIG. 7. As described above, the quantum key delivery layer 30 can include a plurality of communication networks. The quantum key delivery service management server 10 may perform the prediction of the consumption amount of the encryption keys for each communication network included in the quantum key delivery layer 30.

The quantum key delivery service management server 10 obtains the consumption amount of the encryption keys from the encryption key consumption record management DB 153 (S101). The quantum key delivery service management server 10 calculates the predicted consumption amount of the encryption keys from the obtained consumption amount of the encryption keys (S102). The quantum key delivery service management server 10 stores the calculated predicted consumption amount of the encryption keys in the encryption key consumption prediction management DB 154 (S103).

Figure 9:
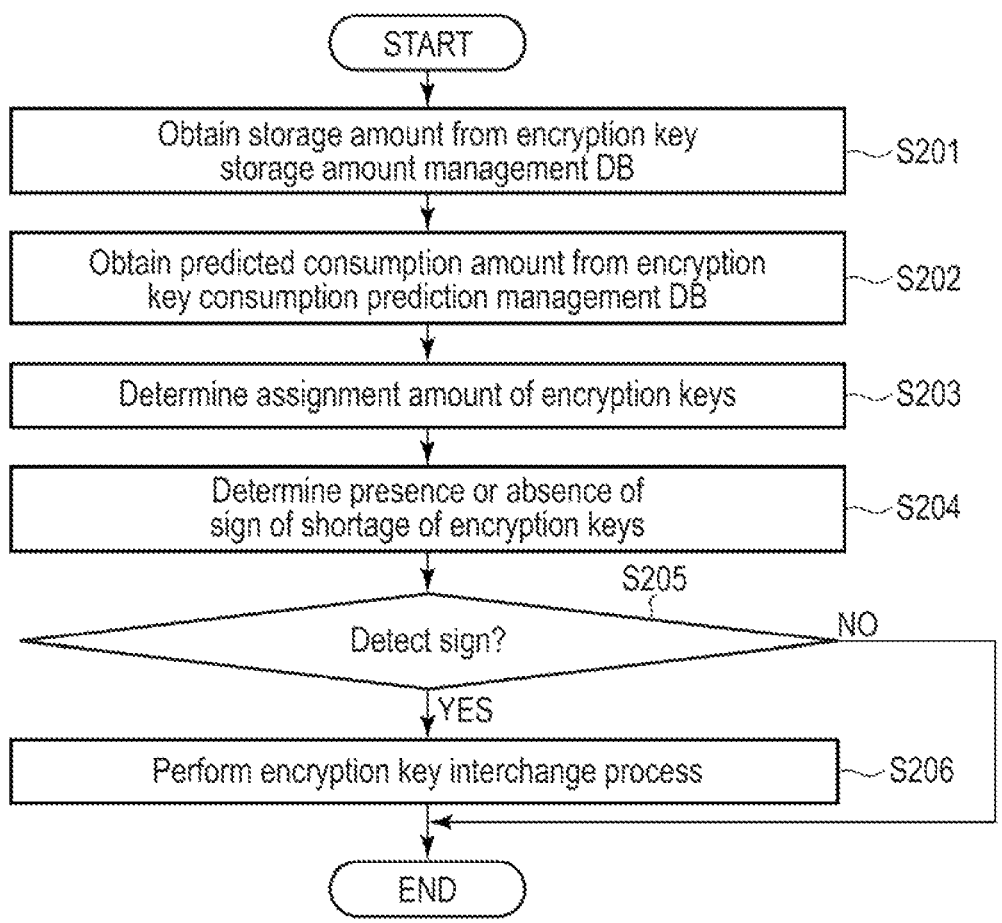
FIG. 9 is a flowchart showing an example of a flow of determination of the allocation amount of the encryption keys and detection of a sign of shortage of the encryption keys by the quantum key delivery service management server of the quantum key delivery service platform of the embodiments.

FIG. 9 is a flowchart showing an example of a flow of determination of the assignment amount of the encryption keys and detection of a sign of shortage of the encryption keys, by the quantum key delivery service management server 10 of the quantum key delivery service platform 1 of the embodiments. The quantum key delivery service management server 10 continuously performs the determination of the assignment amount of the encryption keys and the detection of prediction of shortage of the encryption keys. The determination of the assignment amount of the encryption keys and the detection of a sign of shortage of the encryption keys may also be performed for each communication network included in the quantum key delivery layer 30.

The quantum key delivery service management server 10 obtains the storage amount of the encryption keys from the encryption key storage amount management DB 152 (S201). In addition, the quantum key delivery service management server 10 obtains the predicted consumption amount of the encryption keys from the encryption key consumption prediction management DB 154 (S202). The quantum key delivery service management server 10 determines the assignment amount of the encryption keys generated by the quantum key delivery device 21A, based on the obtained storage amount of the encryption keys and the obtained predicted consumption amount of the encryption keys (S203). At this time, the quantum key delivery service management server 10 may further use information in the encryption key consumption record management DB 153. In addition, at this time, the quantum key delivery service management server 10 may also divide the amount of encryption keys generated by the quantum key delivery device 21A into two at a predetermined ratio, equally assign the amount on one side, and dynamically determine the assignment amount on the other side.

Subsequently, the quantum key delivery service management server 10 determines whether or not there is any cryptographic communication showing a sign of shortage of the encryption keys caused by, for example, sudden consumption of the encryption keys, which greatly exceeds the predicted consumption amount of the encryption keys, of the cryptographic communications which are being performed, based on the storage amount of the encryption keys and the predicted consumption amount of the encryption keys (S204). At this time, the quantum key delivery service management server 10 may further use information in the encryption key consumption record management DB 153. When detecting the sign of shortage of the encryption keys (S204: YES), an encryption key interchange process whose flow is exemplified in detail in FIG. 10 (S206). When detecting no sign of shortage of the encryption keys (S204: NO), the quantum key delivery service management server 10 skips the process of S206.

Figure 10:
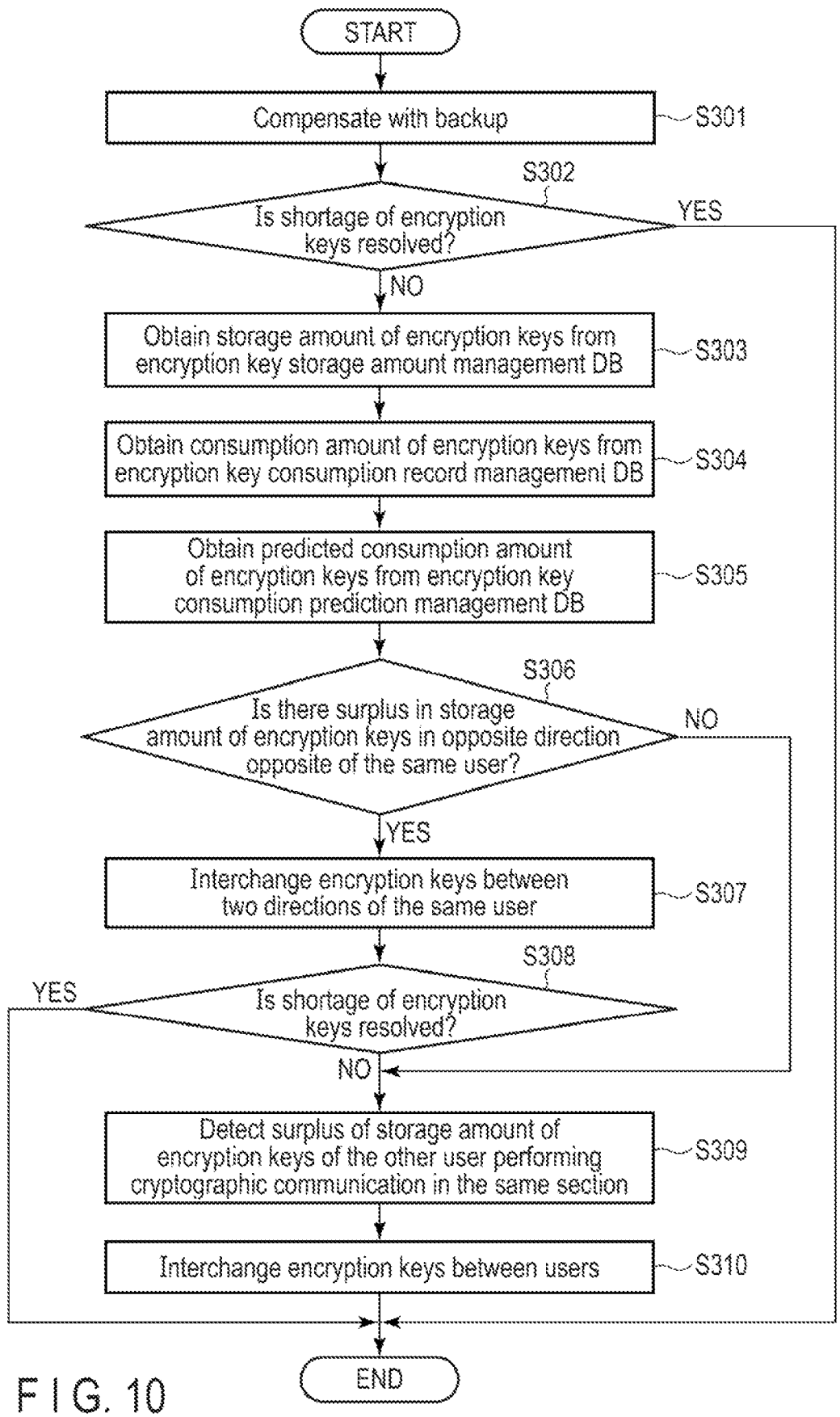
FIG. 10 is a flowchart showing an example of a flow of an encryption key interchange process by the quantum key delivery service management server of the quantum key delivery service platform of the embodiments.

FIG. 10 is a flowchart showing an example of the detailed flow of the encryption key interchange process in S206 of FIG. 9, which is performed when a sign of shortage of the encryption keys is detected.

The quantum key delivery service management server 10 first performs compensating with the encryption keys stored as a backup (S301). If the shortage of the encryption keys is resolved by compensating with the backup (S301: YES), the quantum key delivery service management server 10 ends the encryption key interchange process related to the encryption communication.

If the shortage of the encryption keys is not resolved (S302: NO), the quantum key delivery service management server 10 obtains the storage amount of the encryption keys from the encryption key storage amount management DB 152 (S303). In addition, the quantum key delivery service management server 10 obtains the consumption amount of the encryption keys from the encryption key consumption record management DB 153 (S304). Furthermore, the quantum key delivery service management server 10 obtains the predicted consumption amount of the encryption keys from the encryption key consumption prediction management DB 154 (S305).

The quantum key delivery service management server 10 first determines whether there is a surplus in the storage amount of the encryption keys for cryptographic communication in the direction opposite to the direction in which the sign of shortage has been detected, with respect to the cryptographic communication for which the sign of shortage of the encryption keys has been detected (S306). If there is a surplus (S306: YES), the quantum key delivery service management server 10 first performs encryption key interchange between the two directions of the cryptographic communication (S307). The quantum key delivery service management server 10 determines whether the shortage of the encryption keys can be resolved by interchanging the encryption keys between these two directions (S308). If the shortage is resolved (S308: YES), the quantum key delivery service management server 10 ends the encryption key interchange process for the cryptographic communication.

If there is no surplus in the storage amount of the encryption keys for cryptographic communication in the direction opposite to the direction in which the sign of shortage has been detected (S306: NO) or if the shortage of the encryption keys is not resolved by interchanging the encryption keys between two directions (S308: NO), the quantum key delivery service management server 10 detects the surplus of the storage amount of the encryption keys, which exists in the cryptographic communication of the other quantum key user 2 performing cryptographic communication in the same section (S309). The quantum key delivery service management server 10 performs encryption key interchange among the users, using the other quantum key user 2 for whom the surplus of the storage amount of the encryption keys has been detected as an interchange source (S310), and ends the encryption key interchange process for cryptographic communication.

As described above, in the quantum key delivery service platform 1 of the present embodiment, the consumption of the encryption keys is predicted, a sign of shortage of the encryption keys is detected, and the compensation route to avoid the shortage is selected. As a result, the quantum key delivery service platform 1 of the present embodiment can adaptively manage the encryption keys.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quantum key delivery service platform comprising:
a plurality of quantum key delivery devices, each comprising a first memory and each being configured to
transmit and receive encryption key information to and from the other another quantum key delivery device among the plurality of quantum key delivery devices, and
generate encryption keys shared with the other quantum key delivery device, based on the encryption key information; and
a management server comprising a second memory and being configured to manage supply of the encryption keys by the plurality of quantum key delivery devices to a plurality of cryptographic communication devices which perform cryptographic communication using the encryption keys,
wherein the management server is configured to
monitor a storage amount of the encryption keys stored for each of the plurality of cryptographic communication devices, in the plurality of quantum key delivery devices,
record a consumption record of the encryption keys for each of the plurality of cryptographic communication devices,
predict a consumption amount of the encryption keys in each of the plurality of cryptographic communication devices, based on the consumption record of the encryption keys,
detect a sign of a shortage of the encryption keys which is likely to occur in cryptographic communication between the plurality of cryptographic communication devices, based on the storage amount of the encryption keys and a prediction result of the consumption amount of the cryptographic keys,
select another cryptographic communication suitable for a compensation source of the encryption keys for which an expected surplus of encryption keys is detected from the storage amount of encryption keys, wherein the selected another cryptographic communication is from other cryptographic communications in the same section as the cryptographic communication of which the sign of shortage is detected, and the selecting is based on the storage amount of the encryption keys and the prediction result of the consumption amount of the cryptographic keys, and
change stored encryption keys for the selected another cryptographic communication to encryption keys for the cryptographic communication of which the sign of shortage is detected.

2. The quantum key delivery service platform of claim 1, wherein
when a first cryptographic communication device and a second cryptographic communication device among the plurality of cryptographic communication devices perform first cryptographic communication using first encryption keys generated between a first quantum key delivery device and a second quantum key delivery device among the plurality of quantum key delivery devices,
the first cryptographic communication device being supplied with the first encryption keys from the first quantum key delivery device, and the second cryptographic communication device being supplied with the first encryption keys from the first quantum key delivery device, and when a third cryptographic communication device and a fourth cryptographic communication device among the plurality of cryptographic communication devices perform second cryptographic communication using second encryption keys generated between the first quantum key delivery device and the second quantum key delivery device, the third cryptographic communication device being supplied with the second encryption keys from the first quantum key delivery device, and the fourth cryptographic communication device being supplied with the second encryption keys from the first quantum key delivery device, and if a sign of shortage of the first encryption keys used for the first cryptographic communication is detected, the management server is configured to instruct the first quantum key delivery device and the second quantum key delivery device to change the second encryption keys stored for the second cryptographic communication to the first encryption keys for the first cryptographic communication.

3. The quantum key delivery service platform of claim 2, wherein when a fifth cryptographic communication device and a sixth cryptographic communication device perform third cryptographic communication using third encryption keys generated between a third quantum key delivery device and a fourth quantum key delivery device among the plurality of quantum key delivery devices, the fifth cryptographic communication device being supplied with the third encryption keys from the third quantum key delivery device, the fourth cryptographic communication device being supplied with the third encryption keys from the fourth quantum key delivery device, and the third encryption keys including a first subset used for data transfer in a first direction of the third cryptographic communication and a second subset used for data transfer in a second direction of the third crypto cryptographic communication, the second direction being opposite the first direction, and if a sign of shortage of the first subset of the third encryption keys used for data transfer in the first direction of the third cryptographic communication is detected, the management server is configured to instruct the third quantum key delivery device and the fourth quantum key delivery device to change the second subset of the third encryption keys stored for data transfer in the second direction, to the first subset of the third encryption keys for data transfer in the first direction.

4. The quantum key delivery service platform of claim 1, wherein the management server is further configured to select the other cryptographic communication, based on a consumption record of the encryption keys.

5. The quantum key delivery service platform of claim 1, wherein the management server is further configured to detect the sign of shortage of the encryption keys, based on a consumption record of the encryption keys.

6. The quantum key delivery service platform of claim 1, wherein the management server is configured to control assignment of the encryption keys generated by the plurality of quantum key delivery devices to the plurality of cryptographic communication devices, based on the storage amount of the encryption keys and the prediction result of the consumption amount of the cryptographic keys.

7. The quantum key delivery service platform of claim 6, wherein the management server is further configured to control the assignment of the encryption keys, based on the consumption record of the encryption keys.

8. The quantum key delivery service platform of claim 1, wherein the management server is configured to reserve some of the encryption keys generated by the plurality of quantum key delivery devices as a backup and, assign, when a sign of shortage of the encryption keys is detected for any cryptographic communication of the plurality of cryptographic communications performed between the plurality of cryptographic communication devices, the encryption keys reserved as the backup to the cryptographic communication for which the sign of shortage of the encryption keys is detected.

\* \* \* \* \*